United States Patent [19]

Karlsson

[11] Patent Number: 5,031,470

[45] Date of Patent: Jul. 16, 1991

[54] DEVICE FOR CONVERTING LINEAR RECIPROCATING MOTION TO ROTARY MOTION

[76] Inventor: Hans Karlsson, Vintervägen 17, S-175 40 Järfälla, Sweden

[21] Appl. No.: 517,846

[22] Filed: May 2, 1990

[30] Foreign Application Priority Data

May 9, 1989 [SE] Sweden .................................. 8901653

[51] Int. Cl.$^5$ .............................................. F16H 25/08
[52] U.S. Cl. ............................................ 74/50; 74/49; 92/129; 92/146; 123/56 C; 123/58 AM
[58] Field of Search ................ 74/49, 50; 92/129, 146, 92/147; 123/56 C, 58 AM

[56] References Cited

U.S. PATENT DOCUMENTS

| | | | |
|---|---|---|---|
| 1,505,856 | 8/1924 | Briggs | 74/50 |
| 1,687,425 | 10/1928 | Briggs | 74/50 |

FOREIGN PATENT DOCUMENTS

| | | | |
|---|---|---|---|
| 252419 | 10/1948 | France | 123/56 C |
| 603720 | 6/1948 | United Kingdom | 123/56 C |
| 631207 | 10/1949 | United Kingdom | 74/50 |

*Primary Examiner*—Allan D. Herrmann
*Assistant Examiner*—David W. Laub
*Attorney, Agent, or Firm*—Nies, Kurz, Bergert & Tamburro

[57] ABSTRACT

An arrangement for converting linear motion from a power source to rotary motion, where the power source is intended to coact with a cam in a manner to produce rotary motion, this rotary motion being carried out by a shaft. The invention is characterized by a first member which comprises a rod-unit (4) or a corresponding element intended to move reciprocatingly, and the cam (2) which is attached to one end of the rod-unit, this cam having curve-shaped parts (20, 21) on solely the surface thereof remote from the rod-unit. A second member includes two mutually opposing wing-shaped parts (6, 7) which project outwardly away from the shaft and which are rigidly connected to the shaft (3). A roller (8, 9) or corresponding element is rotatably mounted on the outer part of each wing (6, 7). The rollers are intended to roll on the cam (2), therewith converting linear motion to rotary motion.

10 Claims, 5 Drawing Sheets

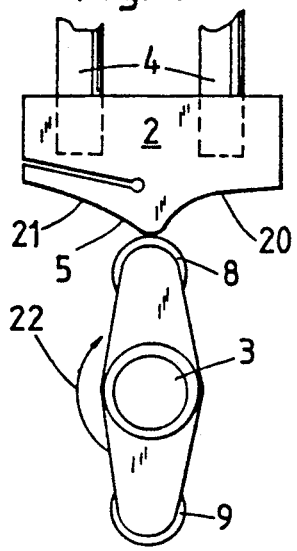
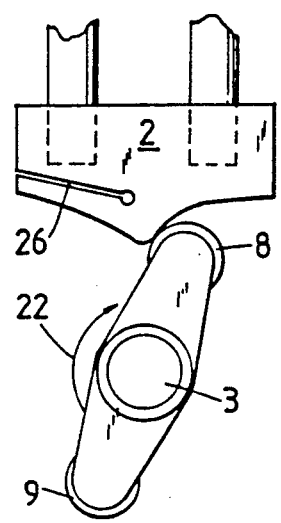
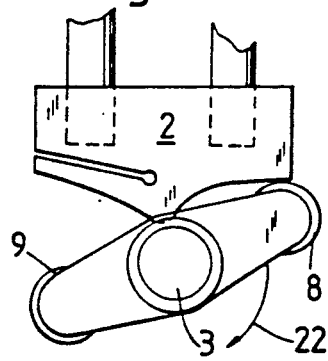
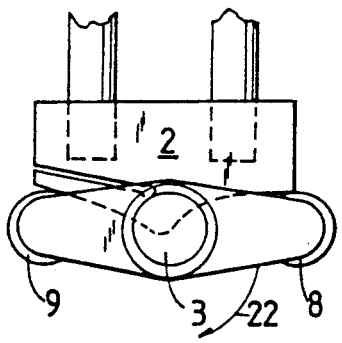
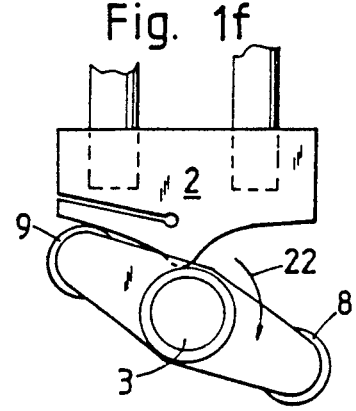
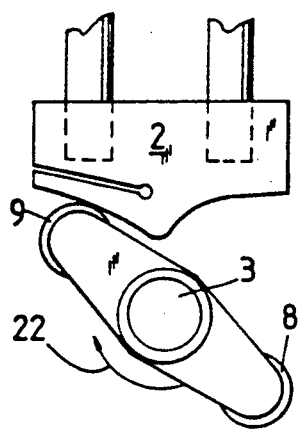
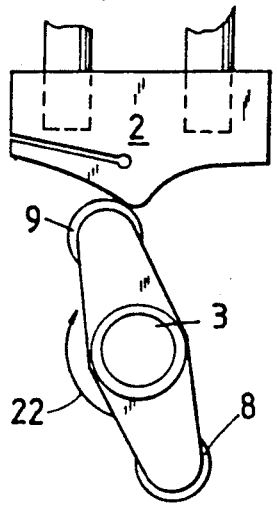
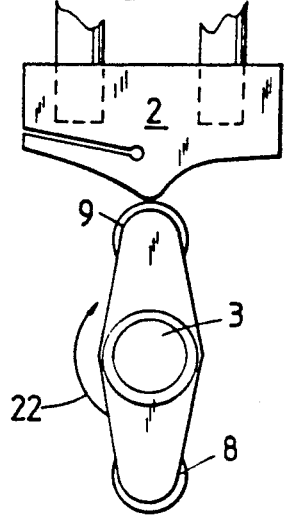

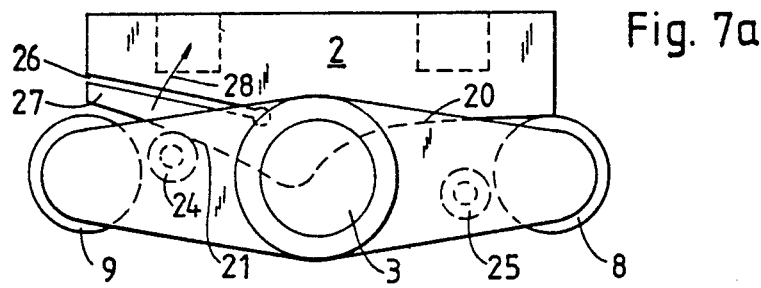
Fig. 7a
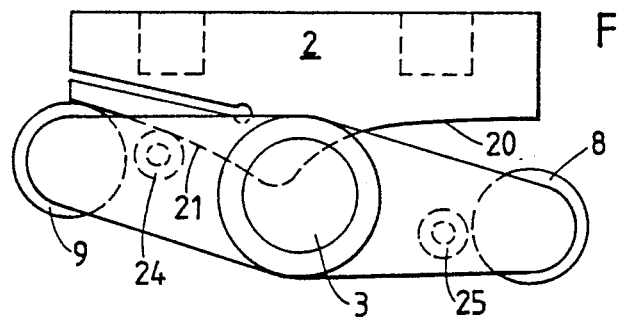
Fig. 7b
Fig. 8
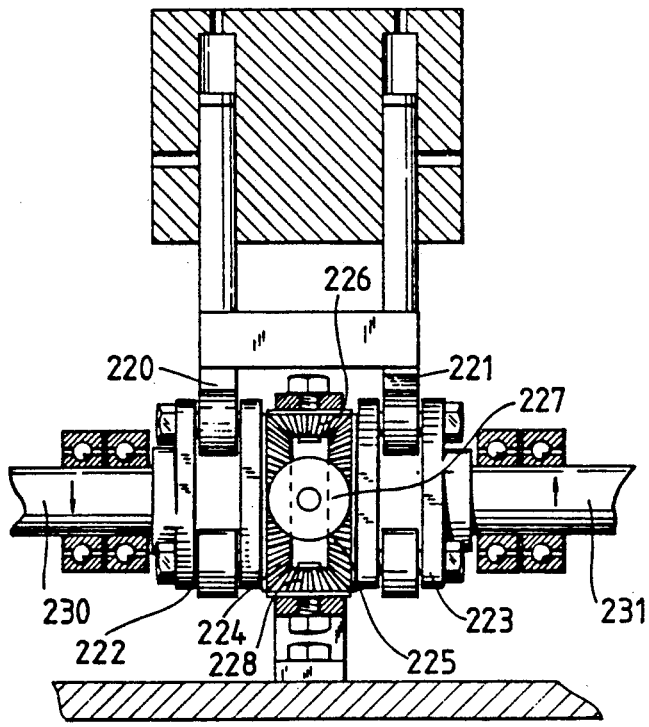
Fig. 9
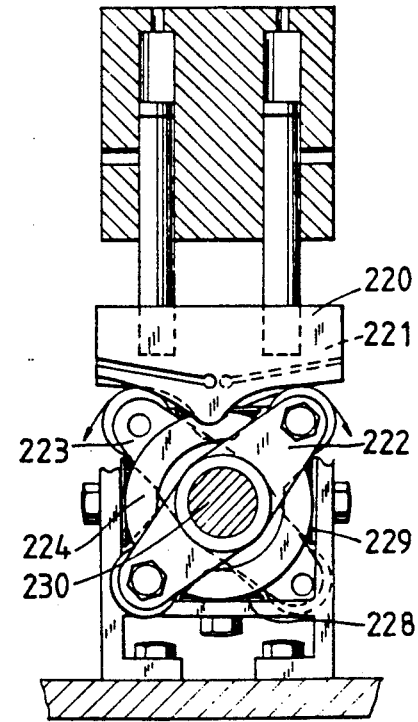

DEVICE FOR CONVERTING LINEAR RECIPROCATING MOTION TO ROTARY MOTION

BACKGROUND OF THE INVENTION

The present invention relates to a device for converting linear reciprocating motion to rotary motion.

The invention is primarily intended for application in those cases where said reciprocating linear motion is generated by the pistons of a power source which has the form of an internal-combustion engine or a compressed-air engine (motor). The invention is not restricted to any particular field of application, however.

FIELD OF THE INVENTION

Swedish Patent Specification No. 8702622-5 describes a device for converting linear motion to rotary motion with the aid of cams. More specifically, the Patent Specification describes a device for converting linear motion, generated by a power source, to rotary motion, where a linearly movable member is intended to rotate a shaft on which a cam is mounted, while lying in abutment with said cam. The device includes two cams which are attached in mutually parallel relationship on a common shaft. Each cam is provided with two mutually opposing wing-shaped parts which project away from said shaft, and the cams are mutually displaced through an angle of 90°. The device also includes two members which are intended to move linearly towards and away from said shaft, with the aid of the power source, and a first of these members is intended to act against a first of the cams, whereas a second of said members is intended to act against the other cam. The aforesaid two members are located opposite one another and act in directions towards an away from said shaft. The members are also mutually connected by means of a dogging element.

An arrangement according to the aforesaid patent specifications produces a higher maximum torque than a conventional crankshaft having the same available length of stroke. Furthermore, a crankshaft is only subject to force once with each revolution, and then only during one half of a revolution. The arrangement of two cylinders connected with a phase-difference of 180° will, however, provide two torque peaks per revolution.

The arrangement according to the aforesaid patent specification and comprising two cylinders and two cams produces four torque peaks with each revolution, at the same time as one of the aforesaid members is constantly in force-transmitting engagement with one of the cams. However, calculated for each working stroke of the piston-cylinder device, the shaft revolution is only half that obtained with a shaft driven by two piston-cylinder devices via a crankshaft.

Trials carried out with an arrangement according to the aforesaid patent specification have shown that a high maximum, and average torque is obtained in comparison with a conventionally configured crankshaft driven by the same power sources having the same length of stroke.

Thus, the arrangement taught by said patent specification has advantages over a conventional crankshaft for converting linear motion to rotary motion.

However, the arrangement known from said patent specification has certain, decisive drawbacks caused basically by the fact that the cam is attached to the shaft to be rotated. As a result of this attachment, manufacture of the cam is both expensive and complicated. Furthermore, as seen in a direction coincident with the longitudinal extension of the piston-cylinder devices, the known arrangement has large dimensions and the procedure of configuring the cam in a manner which will afford a favourable return stroke is complicated. Furthermore, it is expensive to change the configuration of the cam for the purpose of obtaining a different torque curve.

SUMMARY OF THE INVENTION

The present invention eliminates, inter alia, these disadvantages and provides an arrangement which is of simpler construction than the known arrangement and which can be adapted to different requirements more readily and less expensively than said known arrangement.

Accordingly, the present invention relates to an arrangement for converting linear motion from a power source to rotary motion, in which a first member which moves linearly is intended to coact with a cam to generate rotary motion, said rotary motion being performed by a shaft, and is characterized in that said first member includes a rod-unit or a like element operative to carry-out reciprocating movement, and also includes said cam, which is mounted on one end of the rod-unit; in that the cam is provided with curved-parts or lobes on solely the surface thereof distal from said rod-unit; in that a second member comprising two mutually opposing wing-shaped parts projecting out from the shaft are rigidly mounted on said shaft, and a roller or corresponding element is rotatably mounted at the outer part of each wing, said rollers being intended to roll against said cam.

BRIEF DESCRIPTION OF THE DRAWING

The invention will now be described in more detail with reference to exemplifying embodiments thereof illustrated in the accompanying drawings, in which FIGS. 1a–1i illustrate schematically the course followed in one revolution of a shaft included in the arrangement;

FIGS. 7a–7b illustrate, in larger scale, a modified embodiment of a second member forming part of the arrangement;

FIG. 8 is a side view of an arrangement comprising two units which operate with mutually opposite rotational directions;

FIG. 9 illustrates the arrangement of FIG. 8 viewed from the left.

DESCRIPTION OF PREFERRED EMBODIMENTS

Figure 1A:
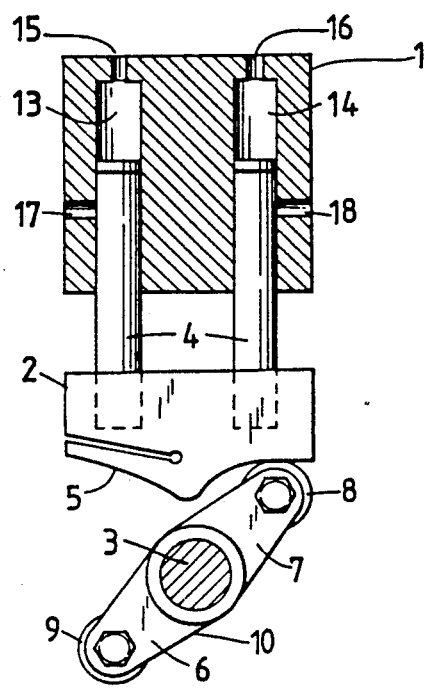

FIG. 1a illustrates the inventive arrangement schematically in a given position of rotation. FIGS. 1b–1i illustrate incrementally the course of one revolution of the shaft of said arrangement.

The inventive arrangement is operative to convert linear motion from a power source 1 to rotary motion, the power source being intended to coact with a cam 2 in a manner to produce rotary motion, this rotary motion being performed by a shaft 3.

The inventive arrangement includes a first member or unit which includes at least one rod-unit 4 or corresponding element intended to move reciprocatingly, and said cam 2. The cam 2 is mounted on one end of the rod-unit 4. The rod-unit 4 of the FIG. 1 embodiment comprises two mutually parallel rods and forms part of the power source and may, for instance, be the piston rod of a piston-cylinder device. Curved parts, or lobes, are provided solely on the surface 5 of the cam 2 remote from the rod-unit 4.

The arrangement also comprises a second member or unit which includes two mutually opposing wing-shaped parts 6, 7 which projects away from the shaft 3 and which are rigidly connected to said shaft. Rotatably mounted on the outer part of each of said wings is a roller 8, 9, or corresponding element, for rolling action on the cam 2.

Figure 2:
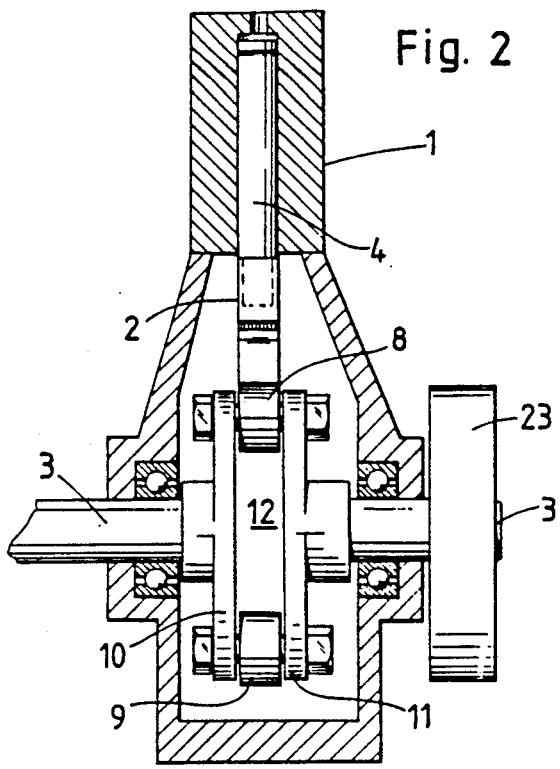
FIG. 2 is a side view of an arrangement which includes a power source.

As will be seen, inter alia from FIG. 2, the two mutually opposing and outwardly projecting wing-like parts 6, 7 are configured by two mutually parallel and mutually abutting wing-shaped carrier parts 10, 11, between which the outer parts of the rollers 8, 9 are carried. Each of the wing-shaped carrier devices 10, 11 is connected with a part of said shaft 3 projecting from the centre part of respective wing-shaped carrier devices. As will also be seen from FIG. 2, the shaft 3 is not a continuous shaft, but is broken by an open space 12 formed between the wing-shaped carrier devices.

FIG. 1a illustrates one embodiment of a power source 1 in the form of two, single-acting compressed-air piston-cylinder devices 13, 14 having piston rods 4. Each of the piston-cylinder devices has a passageway 15, 16 for the supply of compressed air, and a passageway 17, 18 for ventilating the cylinders after each working stroke. Since both of the piston rods 4 are rigidly connected to the cam 2, the piston-cylinder devices are synchronised.

The cam 2 includes two curve-shaped parts 20, 21, see FIG. 1b, of which a first part 20 is intended to coact with said rollers 8, 9 when the rod 4 executes a working stroke, and of which a second part 21 is intended to coact with said rollers 8, 9 for the purpose of executing the return stroke of the rod. The aforesaid two curve-shaped parts 20, 21 meet approximately midway on the cam and form a continuous curve.

FIGS. 1b–1i illustrate a working stroke and a return stroke. FIG. 1b illustrates a starting position. The piston rods 4 are operative to move the cam 2 downwards in FIG. 1b, so as to rotate the shaft 3 from said starting position, in the direction of the arrow 22. When the cam 2 is moved upwards during its working stroke, the roller 8 rolls on the first part 20 of the cam. As the cam is moved downwards, the roller 8 rolls further out on the cam, as illustrated in FIG. 1d, until the position illustrated in FIG. 1e is reached. The working stroke is completed when this latter position is achieved. As illustrated in FIG. 1e, the lowermost part of the cam passes the level on which the shaft 3 is located. The shaft 3 is not continuous for this reason. Because the cam is able to pass the level on which the shaft is located, the inventive arrangement can be given a much smaller height dimension than an arrangement constructed in accordance with the aforesaid patent specification.

One embodiment of the inventive arrangement, see FIG. 2, includes a flywheel 23 which, upon completion of a working stroke, functions to rotate the shaft 3 therewith causing the arrangement to perform a return stroke. The return stroke is illustrated in FIGS. 1f–1i. During the return stroke, the flywheel will thus rotate the shaft 3 in the direction of the arrow 22. As shown in the Figures, the roller 9 will therewith roll on the second part 21 of the cam 2, while urging the cam upwards until the position shown in FIG. 1i is reached. The return stroke is complete when this latter position has been reached. The return stroke is followed by a working stroke, in which the roller 9 rolls on the first part 20 of the cam, this working stroke being followed by a return stroke, and so on.

The described arrangement will therefore produce two torque peaks for each revolution of the shaft 3. It will be understood that the value of the torque for a given power source and also distribution of the torque during the working stroke will depend on the shape of the first curved part 20 of the cam. The part 20 will preferably begin with a relatively steep curve-part, as illustrated in the Figures, so as to provide a relatively high starting torque. As the roller moves further out on the cam, as illustrated in FIG. 1d, the first part of the cam may present a relatively flat curve, since a high torque is therewith obtained by the longer moment arm.

One important advantage afforded by the present invention is that the curve-shaped of the cam can be readily adapted so that the torque is distributed in a desired manner during the working stroke. Different torque distributions may be applicable for different applications. Distinct from the arrangement taught by the aforesaid patent specification, in which the cam used has a particular configuration around the whole of its periphery, it is sufficient when practising the present invention to shape solely that surface of the cam which faces away from the rod-unit 4. The remainder of the cam may have any other configuration whatsoever, although said part will preferably be parallelepipedic.

According to one preferred and highly important embodiment of the invention, the two curve-shaped parts 20, 21 are configured so that when a working stroke has been completed and one of the rollers 8 by means of which the working stroke is carried out abuts one curve-shaped part of the cam, the other of the rollers 9 will abut the other curve-shaped part 21 of said cam, see FIG. 1e. This eliminates the risk of impact when the roller operative to commence the return stroke comes into abutment with the cam. This is an advantage which can only be achieved with an arrangement according to the aforesaid patent specification with very special curve shapes.

However, it is not always necessary, or desirable, for a first roller operative to execute the return stroke to come into full abutment with the cam at the precise moment when the other roller has completed the working stroke. Such an embodiment must be very precise and requires the two curve-parts of the cam to have a mutually adapted shape. In those cases when the two rollers are not intended to come into abutment simultaneously, as in the case illustrated in FIG. 1e, the first roller, however, shall be almost in abutment with the cam at the time when the second roller has completed the working stroke.

According to one alternative, preferred embodiment the arrangement includes further rollers 24, 25 between the wing-shaped carrier devices 10, 11, these rollers 24, 25 being placed between the outer parts of the wings and the centre parts thereof, see FIG. 7a. These rollers 24, 25 are intended to come into abutment with the second curve-shaped part 21 of the cam when the working stroke is completed and one of the rollers 8 by means of which the working stroke is executed is in abutment with one curve-shaped part 20 of the cam. As will be seen from a comparison between FIGS. 7a and 7b, the roller 9 will also lie in abutment with the second part 21 of the cam when the shaft 3 has rotated through a given small angle. Upon still further has rotation of the shaft, solely the roller 9 will lie in abutment with the curve-part 21.

In accordance with one preferred embodiment, the cam 2 is provided with a through-passing slot 26 (see FIG. 7a) which extends substantially parallel with and slightly above the curve-shaped parts 21 of the cam against which a roller abuts during the return stroke. This slot 26 provides a given spring or resilient effect when the roller concerned comes into abutment with the curve-shaped part 21. The tongue 27 formed by the slot 26 will therewith spring slightly in the direction of the arrow 28 shown in FIG. 7a.

The above description has been given solely with reference to one embodiment in which two single-acting compressed-air piston-cylinder devices act on a cam. It will be understood, however, that the arrangement may include several first and second members operative to work on one and the same shaft.

Figure 5A:
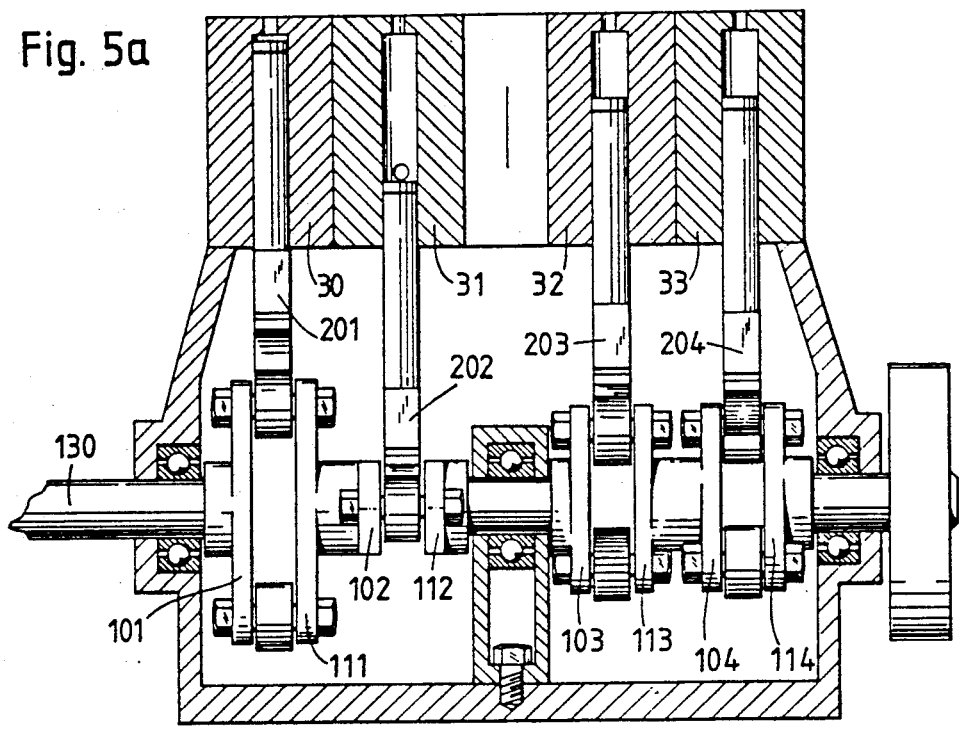
FIG. 5a is a side view of an arrangement which includes four power sources.
Figure 5B:
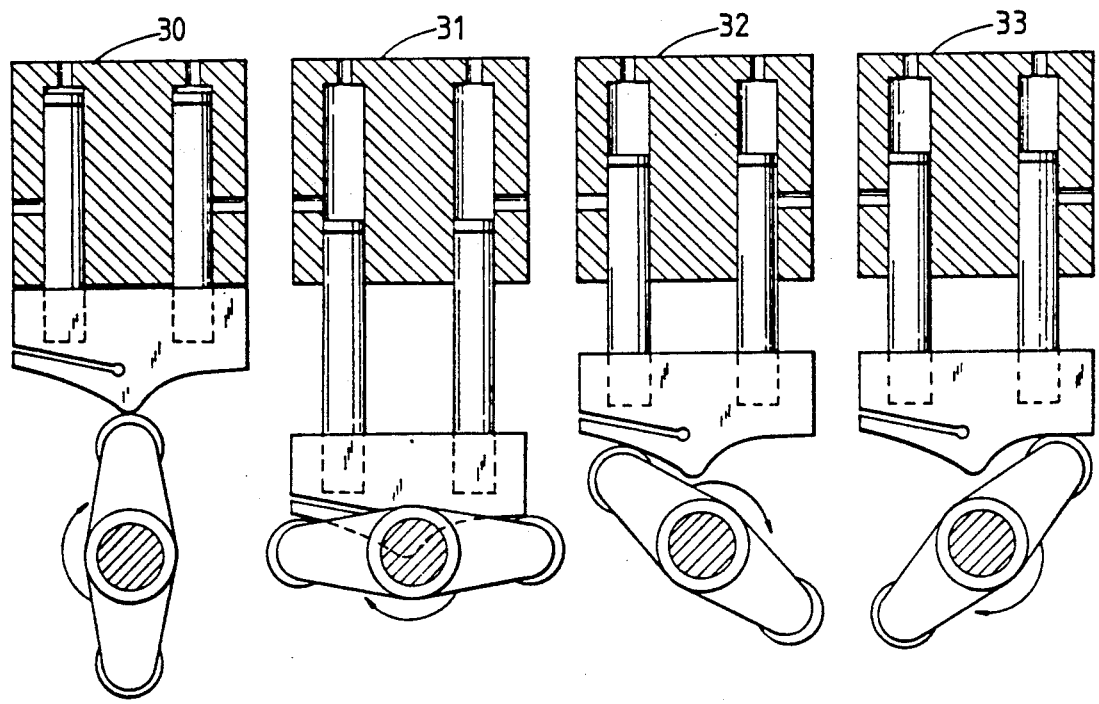
FIG. 5b illustrates the positions of different components of the FIG. 5a illustration.

FIG. 5a illustrates an embodiment which includes four cams 201-204. These cams act on four pairs of wing-shaped carrier devices 101-104; 111-114 carrying respective rollers, all of said carrier devices being rigidly connected to one and the same shaft 130. Shaft 130, as is described for shaft 3 in FIG. 2, is not continuous but is separated between the pairs of wing-shaped roller carrier devices. The illustrated power source comprises four pairs of single-acting compressed-air piston-cylinder devices 30-33. With respect to respective positions of the cams and carrier devices, FIG. 5a illustrates a state which corresponds to the positions shown in FIG. 5b. The power sources shown in FIG. 5b are identified with the same reference numerals as those used in FIG. 5a. The directions of rotation are shown by arrows.

It will be understood that the power sources may have a form other than compressed-air piston-cylinder devices. According to one preferred embodiment, the power sources have the form of two-stroke internal combustion engines, in which a working stroke is performed each time the piston moves downwards in the cylinder and a return stroke is performed each time the piston moves up in said cylinder, as is well known. Because such power sources form no part of the present invention, they will not be described in detail here.

One important advantage afforded by the present invention is that there is no fixed connection between the cams and the rollers. This advantage resides in the fact that one or more of the power sources of a larger number of power sources can be taken out of operation when full power is not required. This can be readily achieved, by locking one or more power sources in their uppermost position, illustrated in FIG. 5a. In this case, the associated carrier devices and rollers will rotate freely with the shaft 3, without coming into contact with the stationary cam or cams.

When the curve-shaped parts 20, 21 of a cam are configured so that a roller will come into abutment with the second part 21 at precisely that moment when the other roller has completed a working stroke, the power sources are synchronized with one another.

Figure 3:
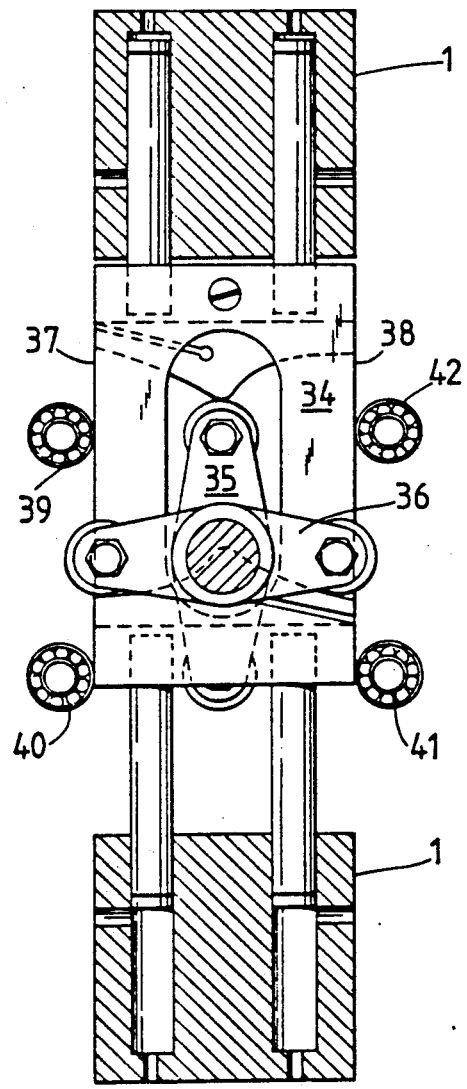
FIG. 3 is a view from above of an arrangement which includes two mutually opposed power sources interconnected by a dogging element.
Figure 4:
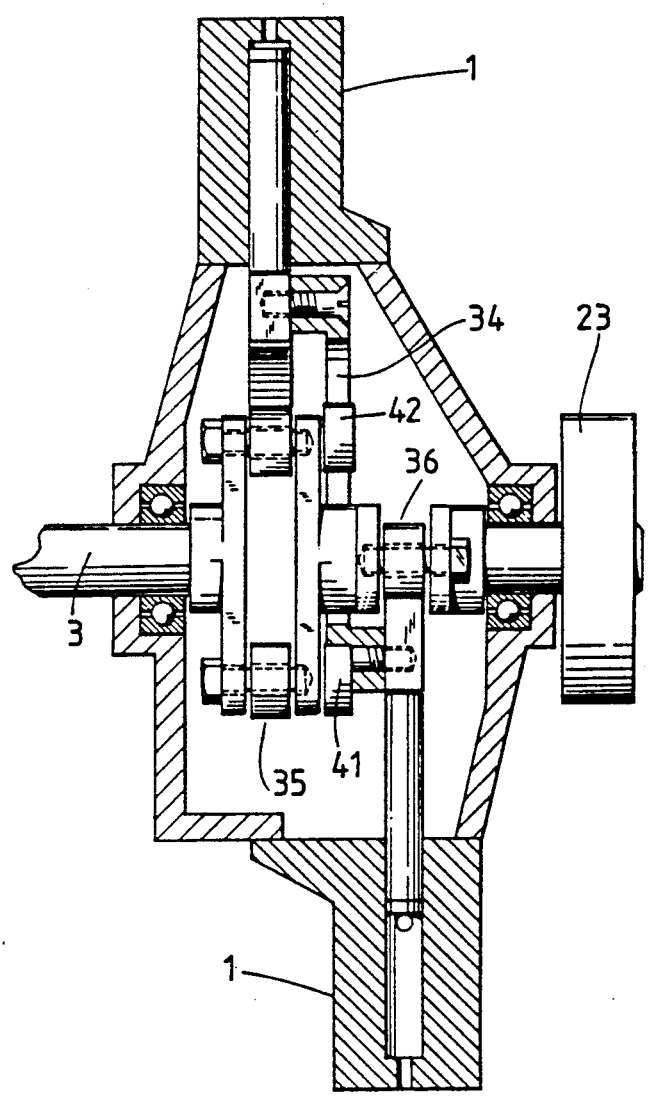
FIG. 4 is a side view of the arrangement illustrated in FIG. 3.

In order to synchronize two or more power sources by direct mechanical means the first members are, in accordance with one preferred embodiment, mutually connected by means of a dogging element 34, as shown in FIGS. 3 and 4. The reference numerals 35, 36 in FIGS. 3 and 4 identify respectively two pairs of carrier devices 10, 11.

In accordance with one preferred embodiment, the dogging element is straight and has sides 37, 38 which extend parallel with the rod-unit and which run against bearings 39-42 operative to take-up occurrent lateral forces manifested when the rollers coact with the cams.

Figure 6A:
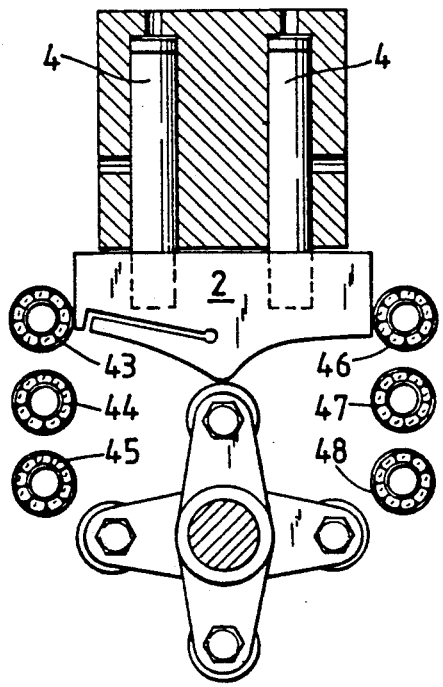
FIGS. 6a–6d illustrate different guides means for a cam forming part of the arrangement.
Figure 6B:
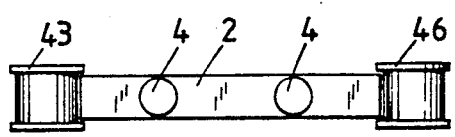
Figure 6C:
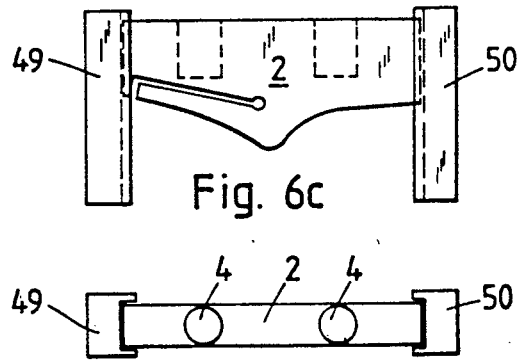
Figure 6D:
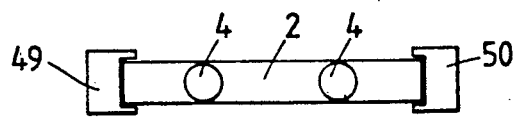

In the case of those embodiments which lack the provision of a dogging element, these lateral forces must be taken-up in some other manner. FIGS. 6a and 6b illustrate an embodiment in which the cam 2 runs between a row of mutually superposed bearings 43-48. FIGS. 6c and 6d illustrate an alternative embodiment in which the cam is journalled in a slide bearing in guides 49, 50.

FIGS. 8 and 9 illustrate a further embodiment of the inventive arrangement, which comprises two mutually connected cams 220, 221. The cams are configured to be a mirror image of one another, such that the one cam 220 will urge the associated second members 222 to the right in FIG. 9, whereas the other cam 221 will urge the associated second members 223 to the left in FIG. 9. This embodiment is operative to reduce any oblique loads that may occur. Oblique loads are reduced particularly when the two cams are located close to one another.

In the embodiment illustrated in FIGS. 8 and 9, the aforesaid two second members are mutually connected by means of a gear arrangement comprising two crown gears 224, 225 and four planet gears 226-229. The planet gears rotate around axles rigidly mounted in relation to the arrangement. Each of the crown wheels is connected to a respective axle 230, 231.

It will be evident from the aforegoing that the present invention solves the problems associated with an arrangement constructed in accordance with the aforesaid patent specification.

The advantages afforded by the present invention reside mainly in the fact that the cam is of much simpler design and less expensive to manufacture, and that the cam can be readily adapted to provide desired torque distribution during a working stroke of the machine.

Furthermore, the cam can be readily configured so that the roller operative to execute a return stroke will come into abutment at precisely that moment when the other roller has completed a working stroke. This avoids the occurrence of impact between roller and cam, while achieving mechanical synchronization between the aforesaid two members at the same time.

Although a number of different embodiments have been described in the aforegoing it will be understood that these embodiments can be modified in many ways. For instance, modifications can be made to the curve-shapes of the cam and to the manner of connecting the cams with the piston rods or corresponding elements of the power source. The number of power sources may also be varied, etc.

The present invention shall not therefore be considered limited to the aforedescribed embodiments, since modifications can be made within the scope of the following claims.

What is claimed and desired to be secured by Letters Patent is:

1. An arrangement for converting linear motion from a power source to rotary motion, said rotary motion being carried-out by a rotatable shaft means, said shaft means having axially spaced-apart coaxial shaft segments, said arrangement comprising: a first mechanism which comprises a rod-unit (4), arranged to carry-out reciprocating movement, and a cam (2; 201–204; 220, 221) attached to one end of the rod-unit, said cam having curve-shaped parts (20, 21) on solely the surface thereof remote from the rod-unit; and a second mechanism comprising two mutually parallel and mutually adjacent and spaced-apart wing-shaped carrier devices, each said carrier device having opposed wing parts which radially project from the center of the associated carrier device and each carrier device being rigidly non-rotatably connected at its center to adjacent ends of two adjacent spaced-apart shaft segments, means rigidly connecting the ends of adjacent spaced-apart wing parts of said two carrier devices, and a roller (8, 9) element rotatably mounted on each said means rigidly connecting said adjacent wing parts, said rollers thereby being disposed between said spaced-apart wing parts and adapted to roll against said curve-shaped parts of said cam (2; 201–204; 220, 221).

2. An arrangement according to claim 1, wherein said curve-shaped parts of said cam (2; 201–204; 220, 221) includes two curve-shaped parts (20, 21) of which, during a 180° rotation of said shaft means, a first of said two curve-shaped parts (20) is adapted to coact with one of said rollers (8, 9) when the rod-unit (4) executes a working stroke, and a second of said two curve-shaped parts (21) is adapted to coact with another one of said rollers to enable execution of the return stroke of said rod-unit (4).

3. An arrangement according to claim 2, characterized in that said two curve-shaped parts merge together to form a continuous curve.

4. An arrangement according to claim 2 characterized in that said two curve-shaped parts (20, 21) are so configured that when a working stroke is completed and one of the rollers (8, 9) operative to carry-out said working stroke is in abutment with said first curve-shaped part (20) of the cam (2) the other of said rollers (8, 9) will be in near abutment with said second curve-shaped part (21) of said cam.

5. An arrangement according to claim 2, characterized in that said two curve-shaped parts (20, 21) are so configured that when a working stroke is completed and one of the rollers (8, 9) by means of which said working stroke is executed is in abutment with said first curve-shaped part (20) of the cam, the other of said rollers (8, 9) will lie in abutment with said second curve-shaped part (20) of said cam.

6. An arrangement according to claim 1, characterized in that the cam (2) is provided with a through-passing slot (26) which extends substantially parallel with and at a distance beneath the second (21) of the two curve-shaped parts of the cam against which a roller (8, 9) abuts during a return stroke.

7. An arrangement according to claim 2, wherein, provided between said wing-shaped carrier devices (10, 11) and between the outer parts of said wing parts and the center parts of said carrier devices is a further roller (24, 25) which, when a working stroke is completed and said one of the rollers (8, 9) by means of which said working stroke is carried out abuts said first curve-shaped part (20) of said cam, will come into abutment with said second curve-shaped part (21) of said cam.

8. An arrangement according to claim 1, wherein at least two first (4; 2) and two second mechanisms, (6–9) respectively are provided, in which the two first mechanisms are mutually connected by means of a dogging element (34).

9. An arrangement according to claim 8, characterized in that bearing means are provided adjacent and engaged with said dogging element and said dogging element (35) has straight sides (37, 38) which extend parallel with the rod-unit (4) and which run on said bearings (39–42) which take-up occurrent lateral forces.

10. An arrangement according to claim 1, characterized in that said power source (1) comprises two single-acting compressed-air piston-cylinder devices (13, 14) the respective piston rods of which devices comprise a said rod unit (4) and are parallel and are rigidly connected to said cam (2).

* * * * *